US006069604A

United States Patent [19]

Verhulst

[11] Patent Number: 6,069,604

[45] Date of Patent: May 30, 2000

[54] LIQUID CRYSTAL DISPLAY DEVICE INCLUDING DRIVE CIRCUIT FOR PREDETERMINING POLARIZATION STATE

[75] Inventor: Antonius G. H. Verhulst, Eindhoven, Netherlands

[73] Assignee: U.S. Philips Corporation, New York, N.Y.

[21] Appl. No.: 09/054,111

[22] Filed: Apr. 2, 1998

Related U.S. Application Data

[62] Division of application No. 08/515,668, Aug. 16, 1995, Pat. No. 5,767,829.

[30] Foreign Application Priority Data

Aug. 23, 1994 [EP] European Pat. Off. .............. 94202408

[51] Int. Cl.[7] ........................ G02F 1/13

[52] U.S. Cl. ........................ 345/97; 345/95; 345/98; 345/100

[58] Field of Search ........................ 345/58, 90–92, 345/94–95, 97–98, 100, 205, 212; 348/766; 349/42, 43, 100

[56] References Cited

U.S. PATENT DOCUMENTS

| | | | |
|---|---|---|---|
| Re. 33,120 | 11/1989 | Nagae et al. | 349/37 |
| 4,233,603 | 11/1980 | Castleberry | 345/84 |
| 4,455,576 | 6/1984 | Hoshi | 348/792 |
| 4,621,250 | 11/1986 | Echasseriau et al. | 338/162 |
| 4,638,310 | 1/1987 | Ayliffe | 345/97 |
| 4,840,462 | 6/1989 | Hartmann | 349/85 |
| 4,907,862 | 3/1990 | Suntola | 349/61 |
| 4,973,135 | 11/1990 | Okada et al. | 349/42 |
| 4,976,515 | 12/1990 | Hartmann | 349/37 |
| 4,990,905 | 2/1991 | Kuijk | 345/210 |
| 5,032,830 | 7/1991 | Kuijk | 345/91 |
| 5,032,831 | 7/1991 | Kuijk | 345/91 |
| 5,119,085 | 6/1992 | Yamazaki | 345/96 |
| 5,159,325 | 10/1992 | Kuijk et al. | 345/84 |
| 5,315,396 | 5/1994 | Miyadera | 348/792 |
| 5,379,050 | 1/1995 | Annis et al. | 345/94 |
| 5,428,370 | 6/1995 | Knapp et al. | 345/205 |
| 5,490,000 | 2/1996 | Tanaka et al. | 359/56 |
| 5,546,102 | 8/1996 | Scheffer et al. | 345/100 |
| 5,555,110 | 9/1996 | Konuma et al. | 349/33 |
| 5,585,036 | 12/1996 | Wand et al. | 252/299.01 |
| 5,596,434 | 1/1997 | Walba et al. | 349/123 |
| 5,600,345 | 2/1997 | Dingwall et al. | 345/100 |
| 5,621,439 | 4/1997 | Okada et al. | 345/211 |
| 5,627,560 | 5/1997 | Verhulst | 345/97 |
| 5,684,504 | 11/1997 | Verhulst et al. | 345/97 |
| 5,701,136 | 12/1997 | Huq et al. | 345/100 |
| 5,767,829 | 6/1998 | Verhulst | 345/97 |
| 5,905,484 | 5/1999 | Verhulst | 345/98 |

*Primary Examiner*—Matthew Luu
*Assistant Examiner*—Jeff Piziali
*Attorney, Agent, or Firm*—Robert J. Kraus

[57] ABSTRACT

In Deformed Helix Ferro-electric liquid crystal display devices (DHFLCDs) the memory effect in video applications is interrupted by adapting the data voltages of matrix displays based on MIMs or TFTs, dependent on the data in a previous frame, so that the polarization within a cell always switches to a fixed value (zero). In other types of displays (based on diodes) or for less rapid applications, the polarization can also be readily set at this value.

8 Claims, 9 Drawing Sheets

LIQUID CRYSTAL DISPLAY DEVICE INCLUDING DRIVE CIRCUIT FOR PREDETERMINING POLARIZATION STATE

CROSS REFERENCE TO RELATED APPLICATIONS

This is a divisional of application Ser. No. 08/515,668, filed Aug. 16, 1995 U.S. Pat. No. 5,767,829.

BACKGROUND OF THE INVENTION

The invention relates to a display device comprising a first substrate having a matrix of ferro-electric pixels arranged in rows and columns and comprising a ferro-electric liquid crystal material with a deformable helix between the first and a second substrate and comprising a group of row or selection electrodes and a group of column or data electrodes, each pixel on at least a first substrate comprising a picture electrode which is connected to a column electrode or row electrode via an active switching element, the display device comprising means for presenting selection voltages to the row electrodes and data voltages to the column electrodes and for bringing, prior to selection, a row of pixels to a fixed optical transmission state by means of an auxiliary signal during at least one of two consecutive drive periods.

Such display devices are applicable as video displays, but also, for example in datagraphic monitors or as viewfinders.

A ferro-electric liquid crystal material with a deformed helix is usually understood to mean a ferro-electric liquid crystal material having a natural helix whose pitch is smaller than the wavelength of visible light (up to approximately 400 nm). An electric field perpendicular to the axis of the helix deforms this helix, which results in a rotation of the optical axis. The transmission between crossed polarizers, with one of the polarizers being parallel to the axis of the helix, then increases with the value of the field for both positive and negative values of the field.

A display device as mentioned above is described in "A Full-Colour DHF-AMLCD with Wide Viewing Angle" in SID 94 DIGEST, pp. 430–433. The use of devices with DHFLC material (Deformed Helix Ferro-electric Liquid Crystal) is described in this article as being advantageous with respect to SSFLC devices (Surface Stabilized Ferro-electric Liquid Crystal) due to the absence of multidomains, while due to a more continuous change of the transmission/voltage characteristic grey levels can be better realised. In spite of the rapid switching time which is mentioned for the mixture used in the display device, the frame frequency remains, however, too low for video applications (NTSC or PAL). In the device described a phenomenon referred to as "image sticking" or "after images" also occurs.

SUMMARY OF THE INVENTION

It is an object of the invention to provide a display device of the type described in the opening paragraph, which can operate at frame frequencies of more than 20 Hz (for example 50 Hz (PAL)).

It is another object of the invention to provide a device in which there are few or no "afterimages".

To this end, a display device according to the invention is characterized in that the display device comprises a drive circuit for presenting a compensation voltage which determines the voltage amplitude of the auxiliary signal, at least a part of the compensation voltage being determined by the data voltage across the pixel during a previous drive period.

In this connection, a compensation voltage is to be understood to mean a voltage which is presented either externally or is obtained, for example by adding and/or subtracting internal voltages. The drive period is understood to mean a regularly recurring period within which the display cells are provided with selection signals. If necessary, a reset pulse may also be presented within each drive period, but this is not strictly necessary. "A part" is understood to mean that other voltages can be added, for example voltages across diodes, transistors or other switching elements, or that the compensation voltage is obtained, for example, as a difference between the data voltage and another voltage (a reset voltage or a selection voltage). Moreover, the data voltage may be, for example inverted or have undergone a correction.

The invention is based on the recognition that in contrast to known (ferro-electric) liquid crystal display devices, the spontaneous polarization in DHFLC materials plays such a large role when the voltage is provided across a pixel that this either requires such a long time that the display device as a whole becomes too slow, or that the pixel does not receive the desired charge so that there is an incomplete reset if it is attempted to bring a row of pixels, prior to selection, to, for example an extreme optical transmission state by means of the auxiliary signal. Since the charge (and hence the transmission value) across the pixel is then undefined again after this reset, the data signal then provided during a subsequent selection will lead to a different final value of the charge (and hence the transmission value) across the pixel than is intended, and so forth. Even at one and the same grey level of the pixel to be written during a period covering a plurality of frame periods, it may take several frame periods before this "memory effect" is eliminated.

In a display device according to the invention, both the incomplete definition of the reset state and the "memory effect" are eliminated to an at least substantially complete extent because the polarization of one or more pixels always switches to a fixed amplitude (i.e. a fixed transmission value) during presentation of the auxiliary signal (reset signal) via the drive circuit prior to selection by presenting a compensation voltage which determines the voltage amplitude of the auxiliary signal.

A first preferred embodiment of a display device according to the invention is characterized in that the compensation voltage is determined by the data voltage during the previous drive or frame period. The polarization which is present during a previous frame is thereby always eliminated so that a polarization of the pixel of always the same value (for example, zero) will be the basis for writing the next frame. Since the amplitudes of the selection voltages for the different frames are usually identical, only a memory is required for the data voltages in this implementation. Such an implementation is notably suitable for using circuits in which the data voltages also influence the reset voltage, such as active matrices realised with MIMs (metal isolator metal) or TFTs (thin-film transistors).

In practice it is sufficient to give the polarization a fixed value only once per two consecutive frame (drive) periods because the signs of the signals, notably when the symmetrical mode is used, are reversed during each frame and because a misadjustment during one frame is acceptable.

A second preferred embodiment of a display device according to the invention comprises a first substrate having a matrix of pixels arranged in rows and columns and comprising a liquid crystal material between the first and the second substrate with a group of row or selection electrodes and a group of column or data electrodes, each pixel on at least a first substrate comprising a picture electrode which is connected to a column electrode via a first active switching element and each pixel comprising a second active switching element which, viewed electrically, is arranged in series with the common point of the first active two-pole switching element and the pixel, and a connection for a reference voltage, the display device comprising means for presenting selection voltages to the row electrodes and data voltages to the column electrodes and for bringing, prior to selection, a row of pixels to a first optical transmission state by means of an auxiliary signal, and is characterized in that the liquid crystal material comprises ferro-electric liquid crystal material with a deformable helix, and the display device comprises drive means for bringing the row of pixels to a first fixed optical transmission state during one of two consecutive drive periods by means of a signal at the row electrode via the second switching element and the reference voltage and for subsequently bringing the row of pixels to a second fixed optical transmission state.

The first fixed transmission state preferably corresponds to the opaque state. The second fixed transmission state is preferably chosen to be such that a maximum scale of grey levels can be adjusted without total dewinding of the helix.

BRIEF DESCRIPTION OF THE DRAWING

These and other aspects of the invention will be apparent from and elucidated with reference to the embodiments described hereinafter.

In the drawing:

FIGS. 7*a* to 7*f*, 8*a* to 8*d* and 9*a* to 9*g* show associated voltage waveforms and associated polarization and transmission variations for the device of FIG. 6, while

DESCRIPTION OF THE PREFERRED EMBODIMENTS

Figure 1:
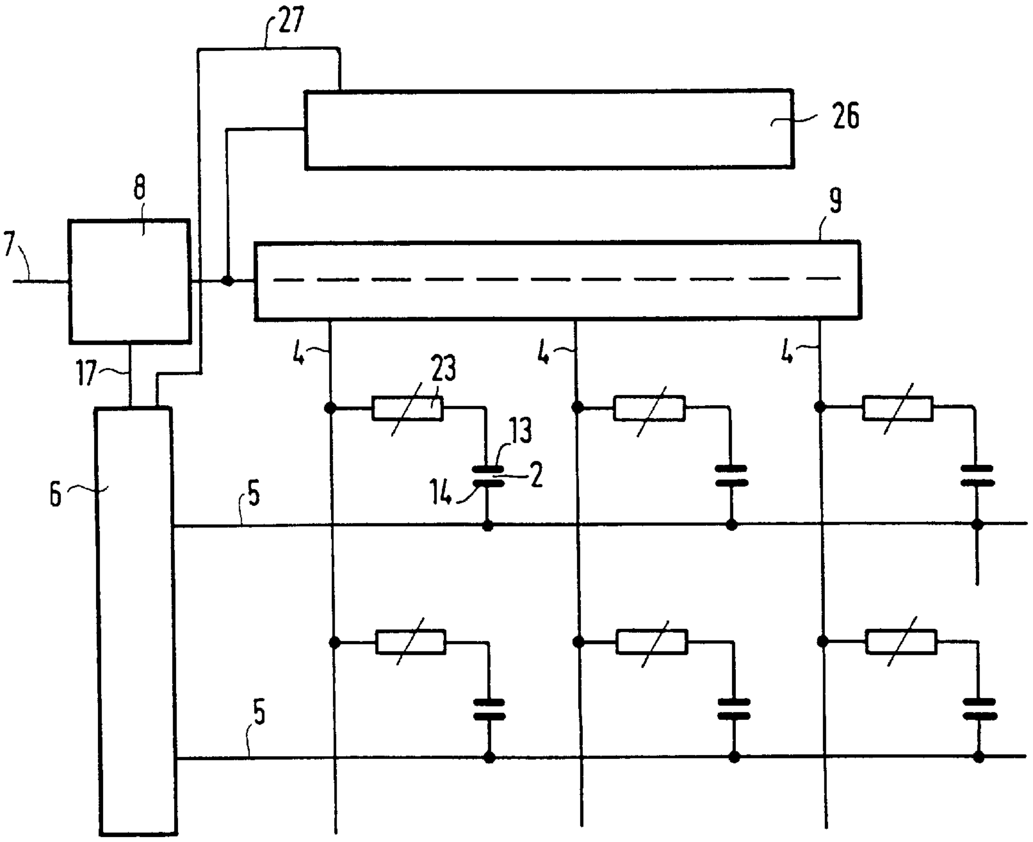
FIG. 1 shows diagrammatically an equivalent circuit diagram of a part of a display device according to the invention.

FIG. 1 shows diagrammatically an equivalent circuit diagram of a part of a display device 1. This device comprises a matrix of pixels 2 arranged in rows and columns. In this example, the pixels 2 are connected to column or data electrodes 4 via two-pole switches, in this example MIMs 23. A row of pixels is selected via row or selection electrodes 5 which select the relevant row. The row electrodes 5 are successively selected by means of a multiplex circuit 6.

Incoming (video) information 7 is stored in a data register 9 and in a memory 26 after it may have been processed in a processing/drive unit 8. The voltages presented by the data register 9 cover a voltage range which is sufficient to produce the desired scale of grey levels. Pixels 2 are charged during selection, dependent on the voltage difference between the picture electrodes 13, 14 and the duration of the information-defining pulse. The picture electrodes 14 constitute a common row electrode 5 in this example.

To prevent that picture information to be written is influenced by charge which is still present across the pixels of a previous (sub-)frame, the pixels are brought to a defined state by means of an auxiliary signal prior to selection, which will be further explained with reference to FIG. 5.

The use of the active switching elements prevents signals for other pixels at the column electrodes from influencing the adjustment of the voltage across the pixels before these pixels are again selected (in a subsequent (sub-)frame).

Figure 2:
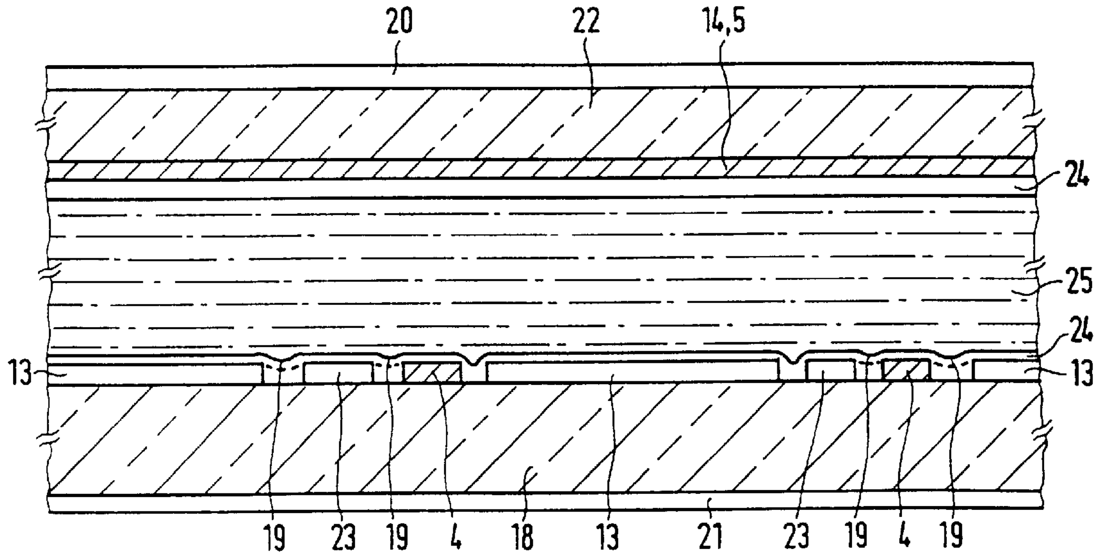
FIG. 2 is a diagrammatical cross-section of the device of FIG. 1, FIGS. 3*a* and 3*b* show diagrammatically the position of the polarizers with respect to the helix (FIG. 3*a*) and a transmission/voltage characteristic (FIG. 3*b*) of a device according to the invention.

FIG. 2 is a diagrammatic cross-section of the device of FIG. 1. Column electrodes 4 and picture electrodes 13, in this example of transparent conducting material, for example indium tin oxide are present on a first substrate 18, which electrodes are connected to the column electrodes 4 via the MIMs 23 by means of connections 19 (shown diagrammatically).

A second substrate 22 is provided with picture electrodes 14 which are integrated to a common row or selection electrode 5 in this example. The two substrates are also coated with orienting layers 24, while a ferro-electric liquid crystal material having a deformable helix 25 is present between the substrates. Possible spacers and the sealing edge are not shown. The device also comprises a first polarizer 20 and a second polarizer or analyser 21 whose axes of polarization cross each other perpendicularly.

Figure 3A:
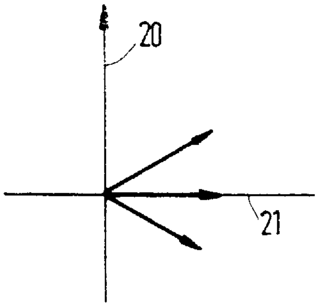
Figure 3B:
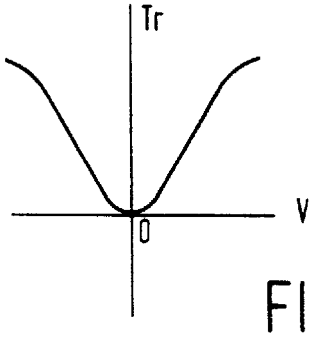

FIG. 3 shows diagrammatically a transmission/voltage characteristic (FIG. 3*b*) of a cell in such a device, in which the optical axis 28 and hence the axis of the helix of the DHFLC material is chosen to be parallel to one of the polarizers (see FIG. 3*a*) in the absence of the electric field, the mode referred to as the symmetrical mode. Due to an applied electric voltage across the cell, the molecules attempt to direct their spontaneous polarization towards the associated field; between crossed polarizers with the axis of the helix parallel to one of the polarizers, this leads to a transmission/voltage characteristic which has an increasing transmission both at positive and negative voltages when the voltage increases (FIG. 3*b*). However, the invention is also applicable in the mode referred to as the asymmetrical mode, in which the crossed polarizers are rotated with respect to the axis of the helix in such a way that the optical axis of the helix of the DHFLC material in the driven state coincides with one of the directions of polarization.

Figure 4A:
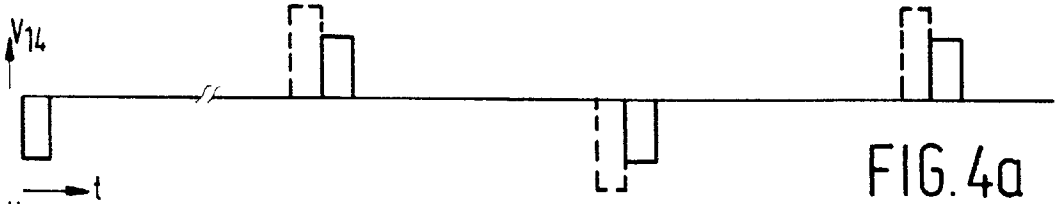
FIGS. 4*a* to 4*e* show diagrammatically some voltage waveforms and associated polarization and transmission variations for the device of FIG. 1, driven by means of a known method.
Figure 4B:
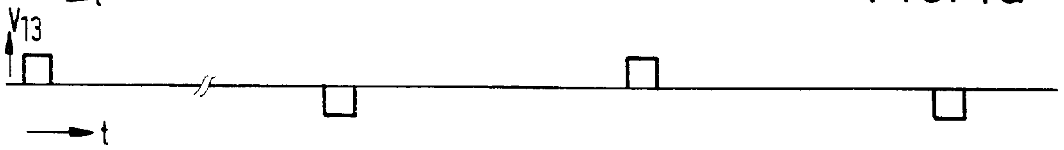

To prevent unwanted charge effects, the cell of the device of FIGS. 1, 2 is preferably driven at voltages having a changing sign. FIG. 4*a* shows the voltage variation at an electrode 14 of such a cell, as defined by drive voltages at the selection electrodes 5, and FIG. 4*b* shows the voltage variation at an electrode 13 of such a cell as defined via the switching elements 23 by drive voltages at the column electrodes 4.

Figure 4C:
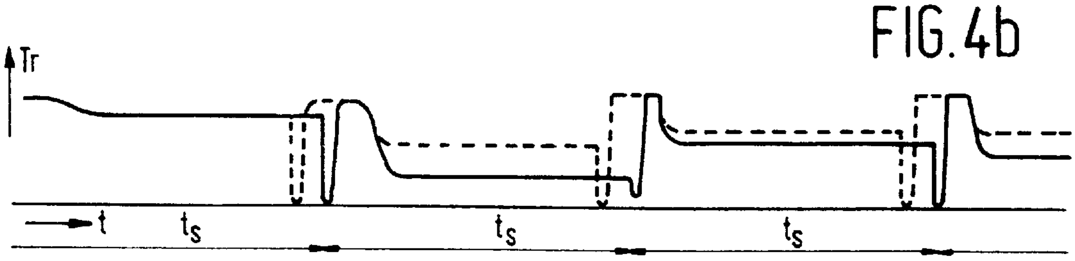
Figure 4D:
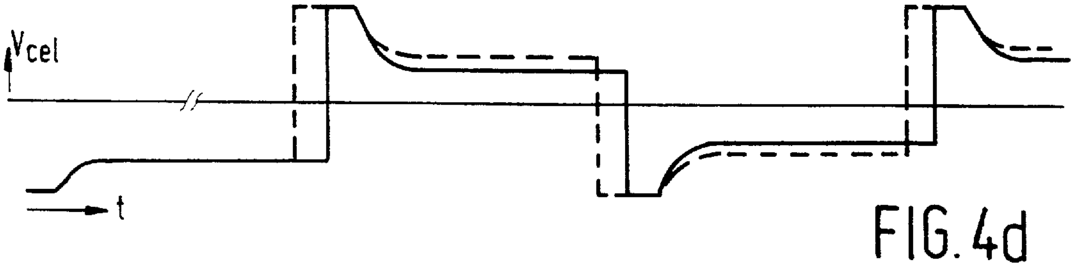
Figure 4E:
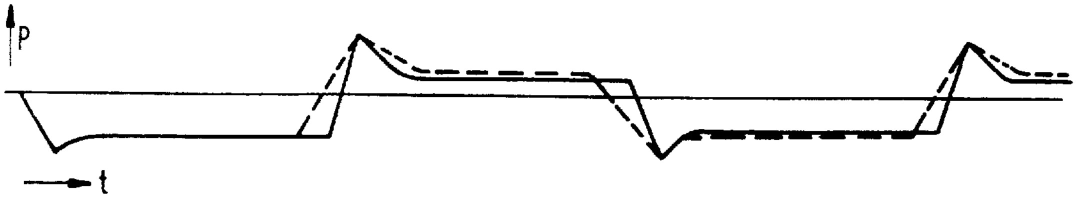

FIG. 4*c* shows the resultant transmission. This Figure shows that at a fixed transmission value T to be set, said transmission reaches the ultimate transmission value T within a plurality (here at least 4) switching periods, apart from short periods of zero transmission, via a number of intermediate values which are both below and above this value, which is completely in contradiction with the expectation based on the high switching rate of the DHFLC material. The explanation of this phenomenon is to be found in the high value of the spontaneous polarization of these materials. The conventional pulse duration of the pulses at the electrodes 13, 14 (in practice comparable with the usual pulse duration of the drive system, for example (64 μsec) in TV systems is too short to supply the polarization current. After selection, the cell with cell capacity $C_0$ has, for example a voltage $V_0$, which corresponds to a charge $Q=C_0.V_0$. During the subsequent non-selection period (corresponding to the rest of a frame period in TV systems) the charge supplies the polarization current (or a part thereof) to be supplied. Consequently, the voltage across the pixel decreases, as is shown in FIG. 4*d*. At sign-changing voltages across the pixel, a part of the (oppositely directed) polarization of the previous setting must be compensated upon each setting. Due to the symmetrical alternating drive, this results in a substantially symmetrical variation of the voltage after 3 to 4 drive periods (sometimes even more) and hence of the polarization around the abscissa as is shown in FIG. 4*e*. Subsequently, the transmission (for constant drive voltages) is substantially constant.

The waiting time to be observed before the ultimate transmission state is reached is, however, unacceptably long. This time may be reduced by the use of "reset" signals. The associated voltages, and the transmission and polarization variations are denoted by broken lines in FIG. 4. As is apparent from the Figure, it will then also take some drive periods before the ultimate transmission value (here a fixed value) is reached.

Figure 5A:
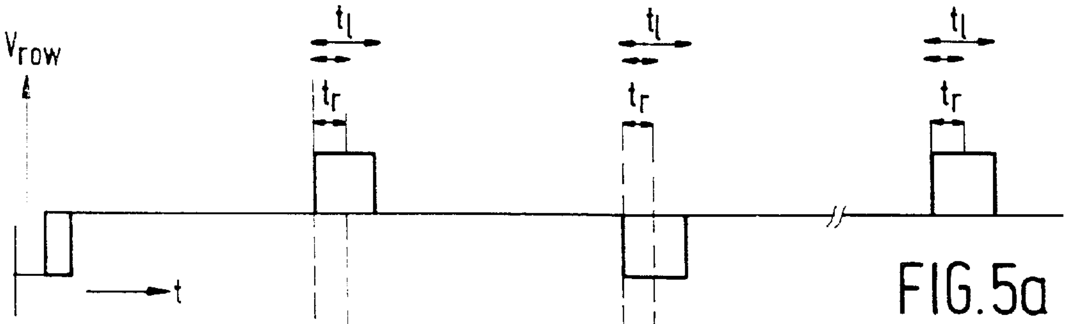
FIGS. 5*a* to 5*e* show diagrammatically the same features as in FIGS. 4*a* to 4*e* when a method according to the invention is used.
Figure 5B:
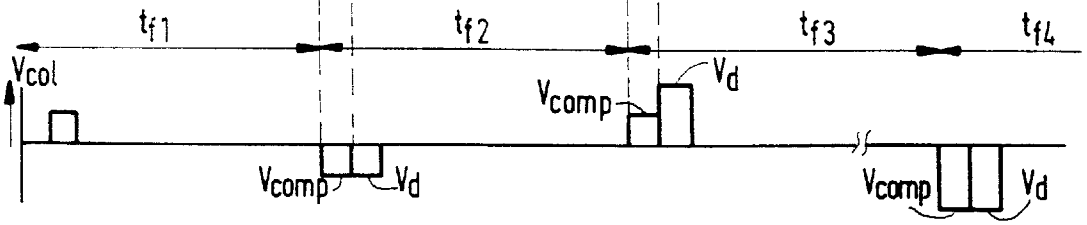
Figure 5C:
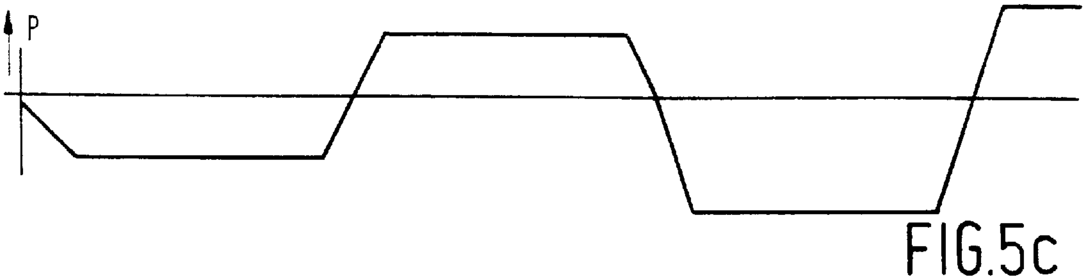
Figure 5D:
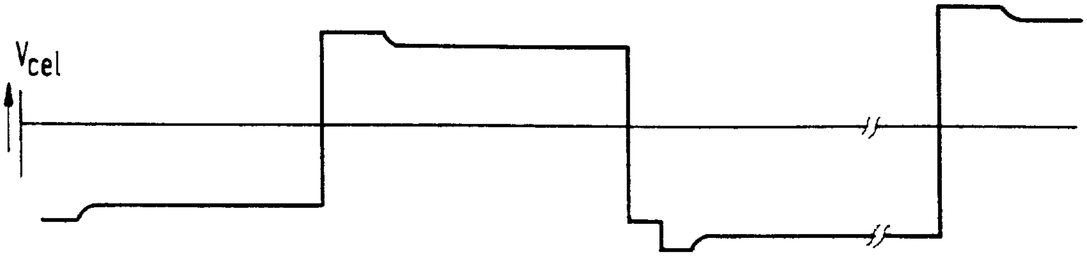
Figure 5E:
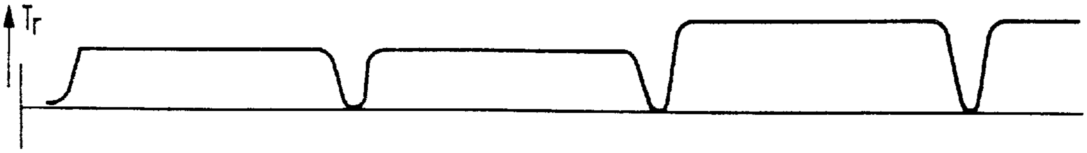

The invention is based on the recognition that the consecutive reset and selection signals cause the polarization of the cells to change sign from invariably different (absolute) values. Consequently, the setting of the cell also changes so that it relaxes towards a final value. FIG. 5 shows a number of drive signals, viz. the selection signals for the row electrodes 5 (FIG. 5*a*) and the data signals for the column electrodes 4 (FIG. 5*b*) in which the invention for the device of FIGS. 1, 2 is realised. The amplitude (and/or pulse width) of compensation signals $V_{comp}$ at column electrodes during the first part $t_r$ of the line period $t_1$ are chosen to be such that due to the auxiliary signal obtained thereby the polarization (FIG. 5*c*) of the cell at the end of the first part of the line period is zero. During the first part $t_r$ of the reset pulses, the amplitude of the compensation pulses is chosen to be such at the start of the frame periods $t_{f2}$ and $t_{f3}$ that the polarization of the cell associated with the frame periods $t_{f1}$ and $t_{f2}$, respectively, is equalized. Since the amplitudes of the polarization in the last-mentioned frame periods are identical, the amplitudes of the compensation pulses are also identical. Since during the third frame ($t_{f3}$) a different data value is used, a different, in this case larger polarization must be compensated in the subsequent frame period. This polarization is shown in FIG. 5*c*. The compensation pulse at the start of $t_{f4}$ is therefore larger than that at the start of $t_{f3}$. Since during the actual selection no polarization of previous frame periods is to be compensated, the desired value of the voltage across the cell is reached immediately after selection, which value now depends only on data and selection voltages. The above-mentioned memory effect is then interrupted. The associated voltages across the cell are shown in FIG. 5*d* and the associated transmission variation is shown in FIG. 5*e*.

To be able to adapt the reset pulses in such a way that a polarization of substantially zero is obtained across a cell (or across a row of pixels), the value of the polarization to be compensated should be known. Since the device is adapted in such a way that the polarization becomes substantially zero before each setting of a new transmission value, it is sufficient to know the polarization which was set during a previous frame. Since the selection voltages do not change their amplitude, it is therefore sufficient to know the data voltage(s) of the previous frame. To this end, the device of FIGS. 1, 2 has a (picture) memory 26 in which incoming information is stored. During the next frame period, the amplitude of the reset pulse is determined by means of these data (possibly via a processor not shown).

Figure 6:
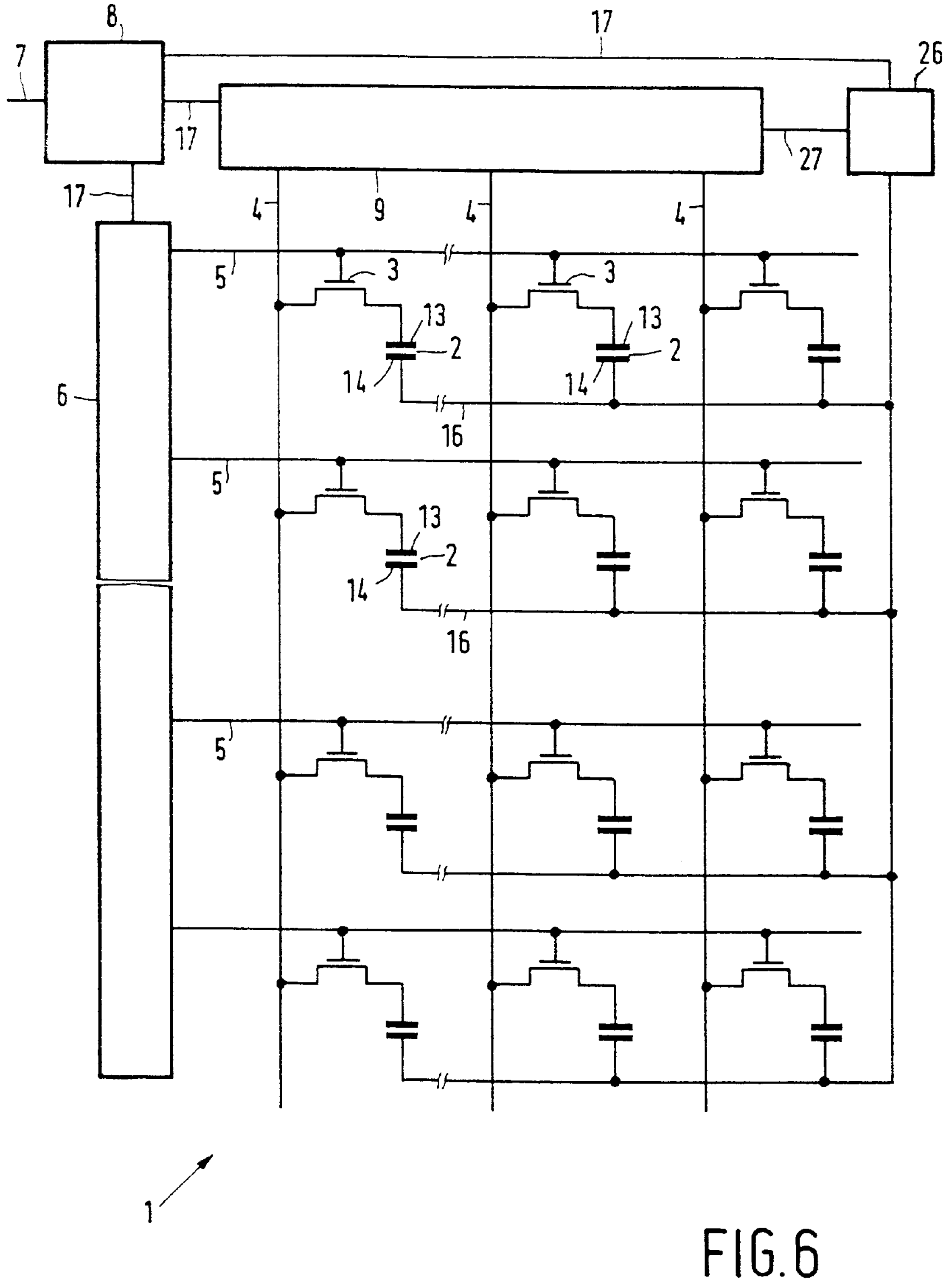
FIG. 6 shows diagrammatically an equivalent circuit diagram of a part of another display device according to the invention.
Figure 7A:
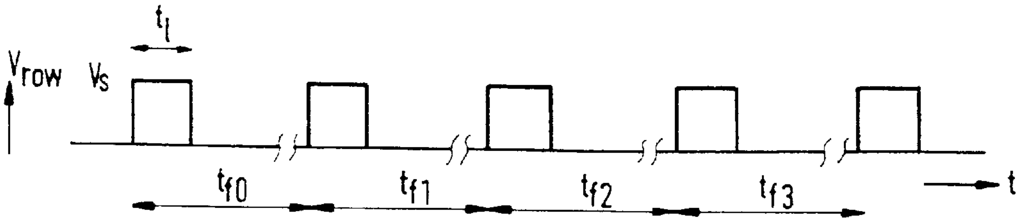
Figure 7B:
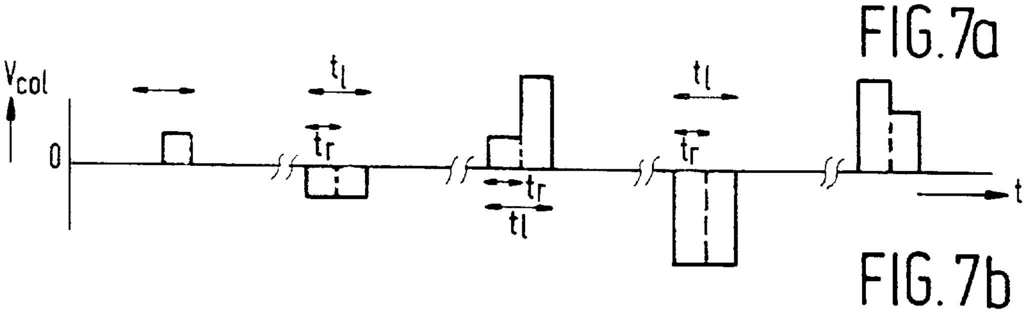
Figure 7C:
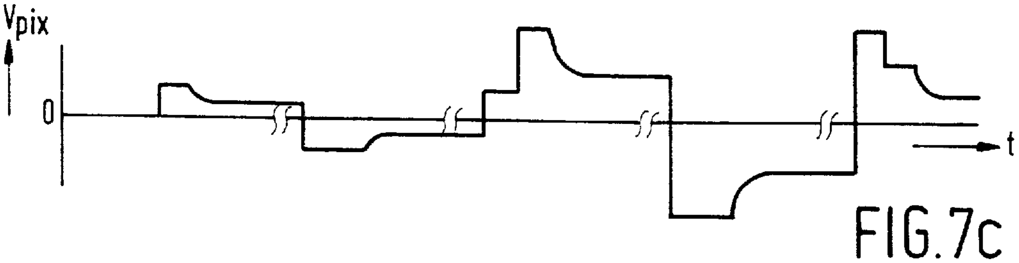
Figure 7D:
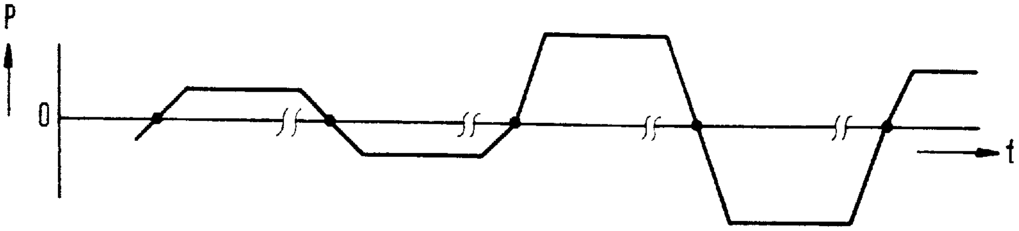
Figure 7E:
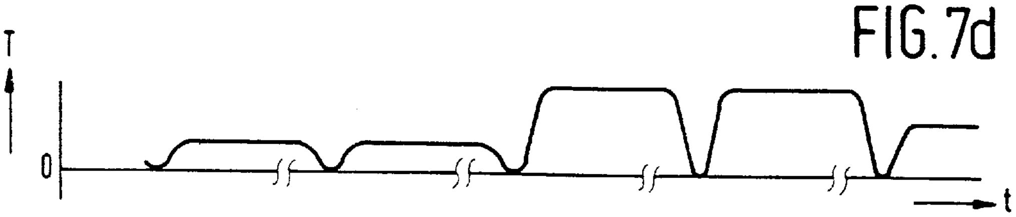
Figure 7F:
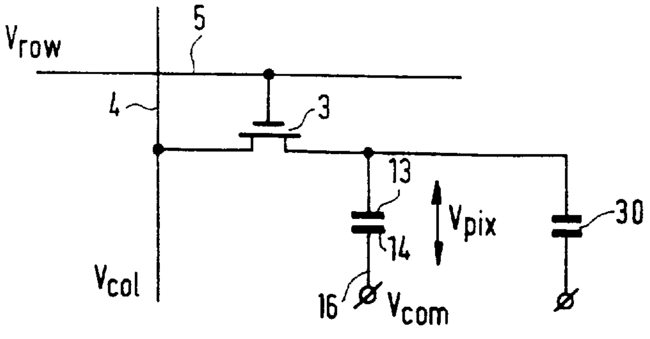
Figure 8A:
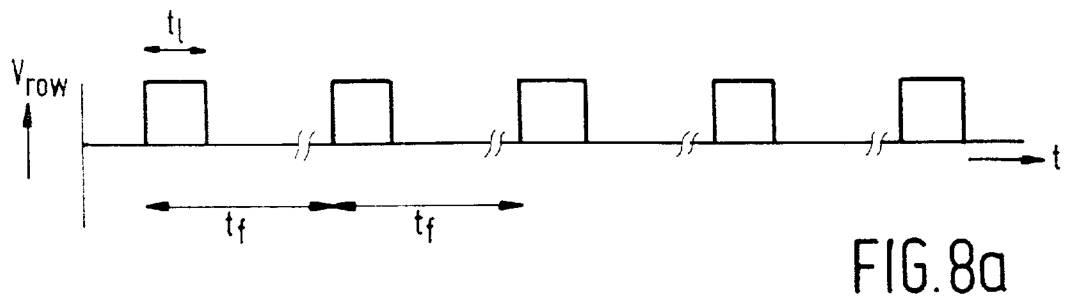
Figure 8B:
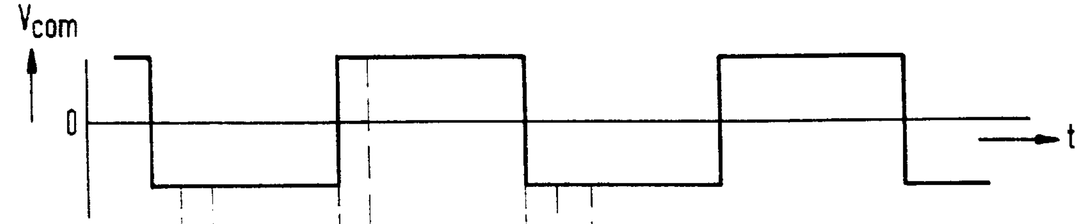
Figure 8C:
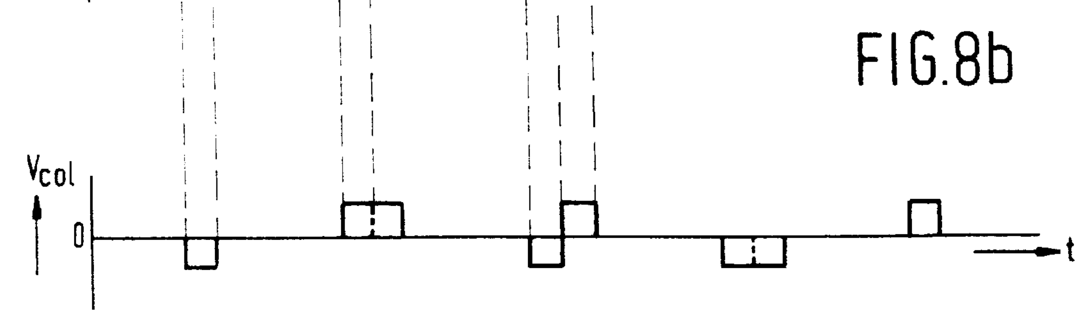
Figure 8D:
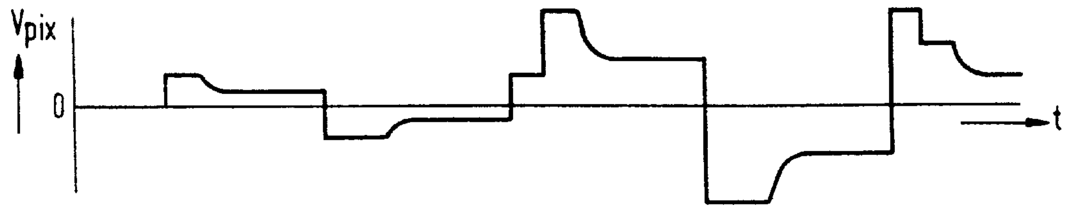

FIG. 6 shows diagrammatically an equivalent circuit diagram of a part of another display device 1. This device again comprises a matrix of pixels 2 arranged in rows and columns. In this example, the pixels 2 are connected to column or data electrodes 4 via three-pole switches, in this example TFT transistors 3. A row of pixels is selected via row or selection electrodes 5 which select the relevant row via the gate electrodes of the TFTs. The row electrodes 5 are consecutively selected by means of a multiplex circuit 6.

Incoming (video) information 7 is stored in a data register 9 after it may have been processed in a processing/drive unit 8. Pixels 2, here represented by means of capacitors, are positively or negatively charged via the TFTs 3 because the picture electrodes 13 take over the voltage from the column electrodes during selection. In this example, the picture electrodes 14 constitute a common counter electrode, denoted by the reference numeral 16.

The device comprises a memory 26 which influences the column voltages of a subsequent frame via the line 27 because the voltage across (a) the pixel(s) is determined by the voltage(s) between the counter electrode and the voltage (s) of the drain zone(s) (drain voltage) of a (the) TFT(s) during a drive by means of TFTs, which voltage(s) is (are) equal to the voltage(s) of the source zone(s) (source voltage), i.e. the column voltage(s).

The variation of the associated voltages as well as the polarization and transmission are shown in FIG. 7. At the start of a frame period $t_f$, a reset voltage is presented to the column electrodes again (FIG. 7*a*, notably $t_{f2}$ and $t_{f3}$) during a period $t_r$ which is half a line period $t_1$, which reset voltage is also dependent on the data voltage during the previous frame. During the second half of the line period, a data voltage is presented (FIG. 7*b*). Due to the choice of the amplitude of the reset pulse, an unambiguous value of the polarization P is set (FIG. 7*d*), in this example zero. FIGS. 7*c* and 7*e* show the associated voltages across the cell and the variation of the transmission.

A variant of FIG. 7 is shown in FIG. 8. The counter electrode 16 is now provided with an alternating voltage $V_{com}$ (FIG. 8*b*), while during selection by means of the row electrodes (FIG. 8*a*) the line period is divided again into a reset part and a write part. Since the reset voltage and the data voltage are now largely supplied via the counter electrode, smaller column voltages will be sufficient (FIG. 8*c*), while a similar voltage variation $V_{pix}$ as in FIG. 7 is obtained across the pixel.

Figure 9A:
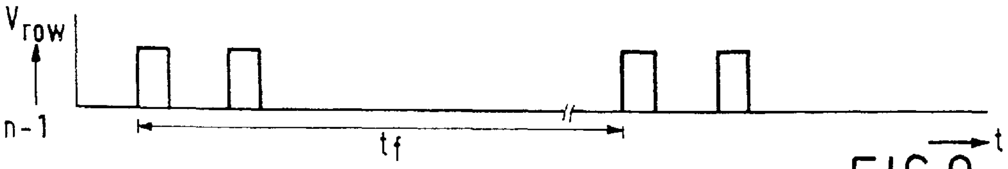
Figure 9B:
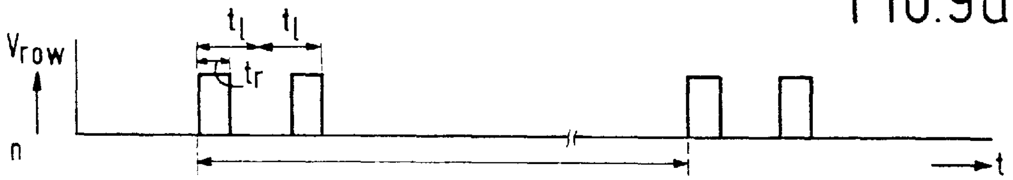
Figure 9C:
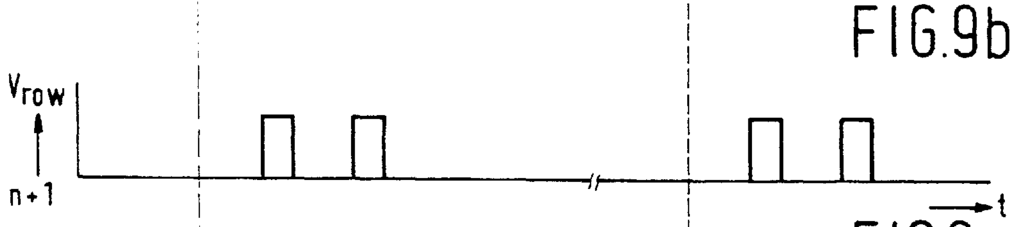
Figure 9D:
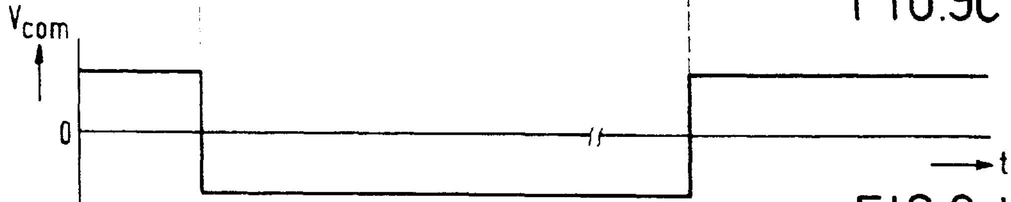
Figure 9E:
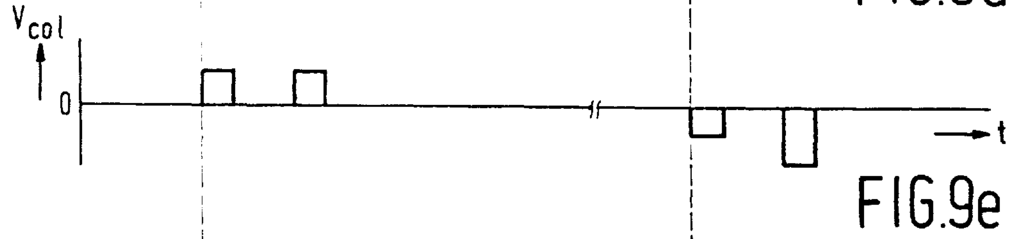
Figure 9F:
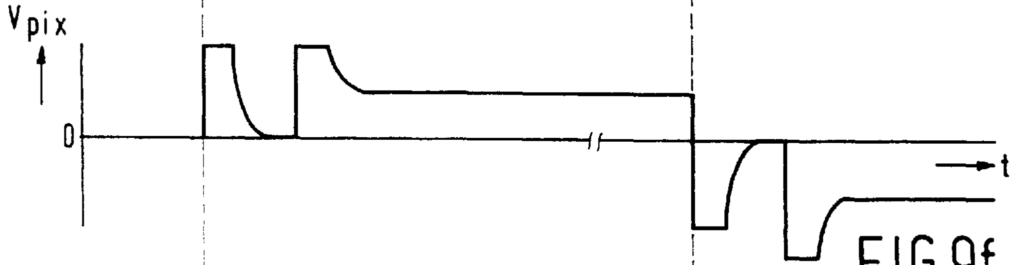
Figure 9G:
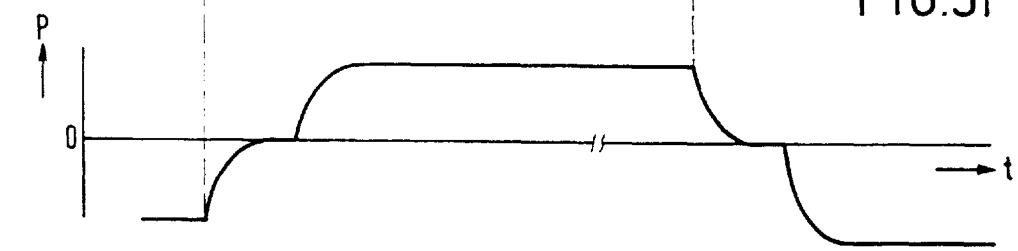

In the variant of FIG. 9 a double line period is used at the start of the frame periods $t_f$ for reset during the first half of the first line period and for writing the data during the second half of the second line period (FIG. 9*b*, $V^n_{row}$). The second half of the first line period of row n is used for setting a picture cell which has already been reset (in this example during the previous line period) (FIG. 9*a*, $V^{n-1}_{row}$) The first half of the second line period of row n is used for resetting a picture cell in the next row (FIG. 9*c*, $V^{n+1}_{row}$). Here again, the voltage at the columns is also determined by the data of a previous frame. Since a longer time is now available between reset and writing (one or more line periods), the polarization can relax to a final value during a longer time; consequently, the desired final value is approached to a better extent. FIGS. 9*f* and 9*g* show the associated voltages across a cell and the variation of the polarization.

At the location of a pixel 2 (FIG. 7*f*), the device may have an additional capacitor, or "storage capacitor" 30. These capacitors are usually realised by a part of a picture electrode which overlaps a (possibly widened) part of a row electrode, while an intermediate layer of, for example $SiO_2$ functions as a dielectric.

If the storage capacity of such an additional capacitor is sufficiently large, the capacitor may comprise enough charge to supply the current for changing the polarization. This has the advantage that the pulse duration of the pulses at the drive electrodes may be shorter so that it is possible to work with higher frame frequencies.

The switching behaviour is now substantially completely determined by the polarization of the pixel because the applied charge is compensated during switching (charge drive). The final value of the transmission (grey level) is then substantially independent of the properties of the liquid crystal material. This renders the device much more insensitive to temperature variations because said polarization is much less sensitive to such variations than the switching rate of the liquid crystal material (which is also determined by temperature-dependent rotation viscosity).

Figure 10:
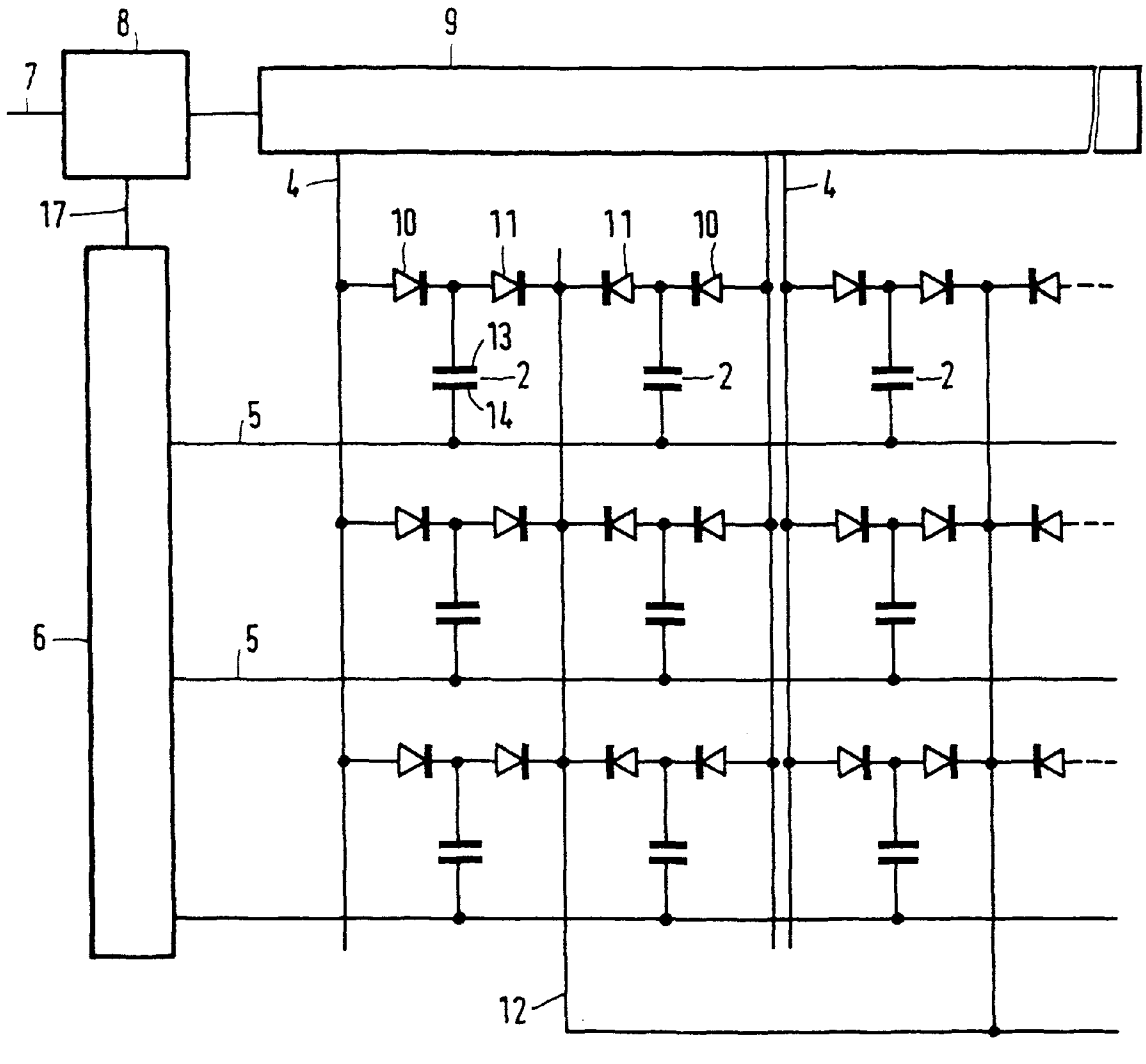
FIG. 10 shows a further device and FIGS. 11*a* to 11*e* show the associated voltage waveforms and polarization and transmission variations for the device of FIG. 10.

FIG. 10 shows diagrammatically an equivalent circuit diagram of a part of a display device including diodes. Of each pixel 2, which is now formed by picture electrodes 13, 14 arranged on facing substrates, the picture electrode 13 is connected in this example to a column electrode 4 via a diode 10 and to a line 12 for a common reference voltage via a second diode 11. The picture electrode 14 of each pixel is connected to a row electrode 5, while a plurality of picture electrodes in a row may be integrated to a row electrode. This implementation has the advantage that the device has a fixed internal compensation voltage at which the polarization can be brought to a fixed value, for example zero so that no extra memory is required. The zero-polarization setting then always takes place via the same current path, viz. the diode 11, while always the same voltage $V_{res}$ is used at the row electrode (FIG. 11*a*); the reset voltage is thus completely data-independent and, if necessary, may cover a plurality of line periods because the same line need not be brought to an extreme state and be selected ($V_{sel}$) immediately thereafter within one and the same line period $t_1$ (during resetting, lines reset in a previous stage are written). Consequently, as shown in FIG. 11, voltage patterns for consecutive lines may mutually differ each time by one line period, which renders it possible to operate DHFLC display devices shown in FIG. 10 at the video rate ($t_1$=64 μsec).

Figure 11A:
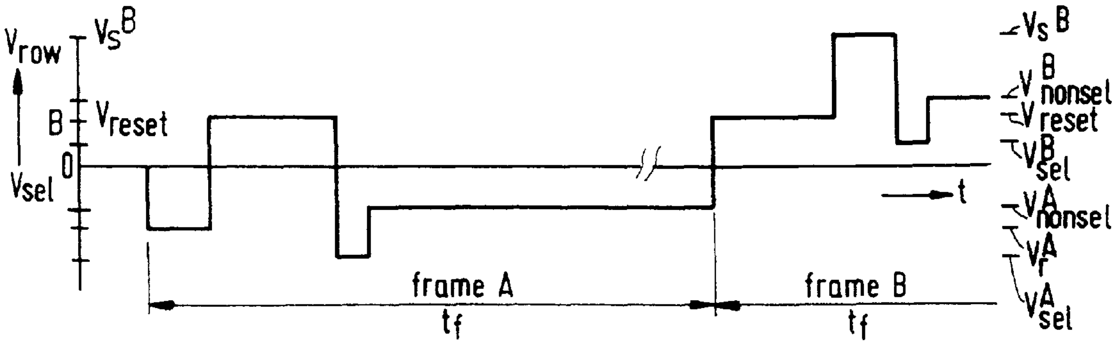
Figure 11B:
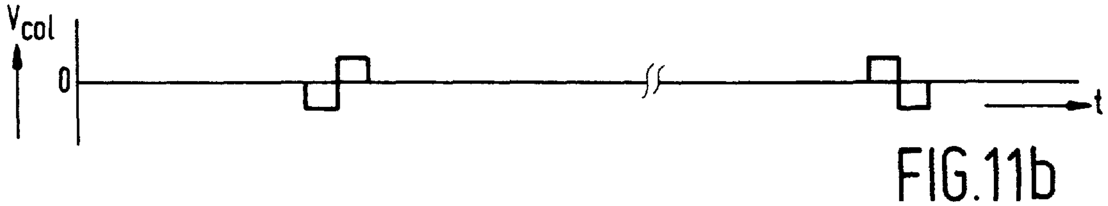
Figure 11C:
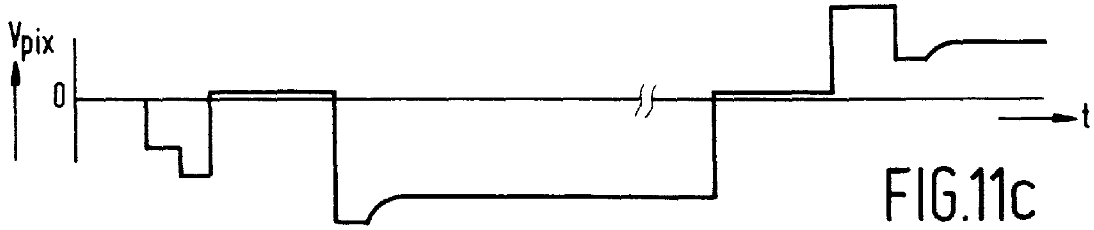
Figure 11D:
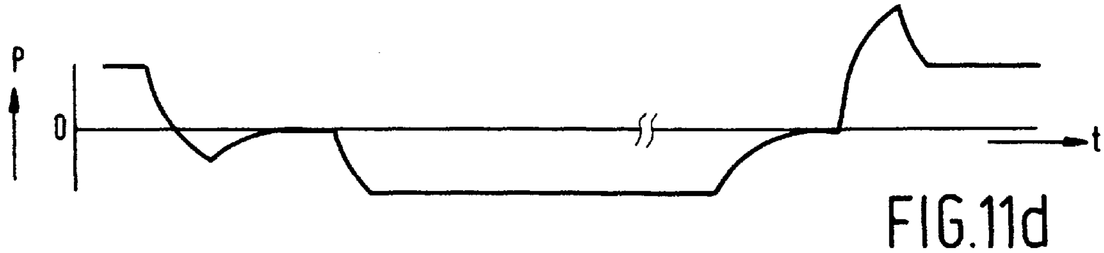
Figure 11E:
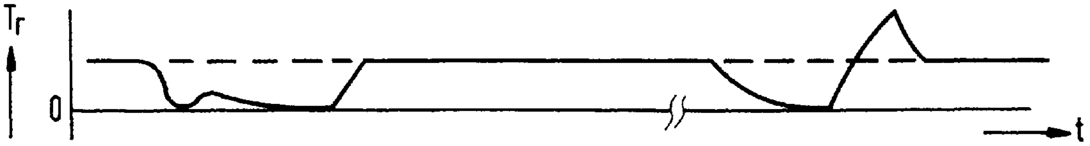

A zero setting of the polarization is always ensured. To prevent that the diode 11 is not blocked by a possibly too low voltage at the common point of the diodes 10, 11, an extra pulse having a value of $V^A_r$ is presented during frame A, prior to the reset pulse $V_{res}$, which extra pulse gives this common point a sufficiently low voltage, independent of data which may be present at the columns. During frame B, the reset pulse $V_{res}$, which again ensures a zero polarization setting, is presented so that here again the memory effect is interrupted. Since the polarization setting is only determined by the current through the diode 11, variations of the column voltage (FIG. 11*b*) do not have any influence. Subsequently, a pulse $V^B_s$ is presented, which pulse brings the display cells to a defined state corresponding to a fixed, high polarization. However, the polarization is not so high that there is complete dewinding of the helix of the DHFLC material. The state of polarization of a cell to be selected during the subsequent line period in frame B is then always the same so that the same state is always used as the basis for the next selection. FIGS. 11*c*, 11*d* and 11*e* again show the associated pixel voltage, polarization and optical transmission.

The invention is of course not limited to the embodiments shown, but several variations are possible within the scope of the invention. For example, both reflective and transmissive display devices can be used. If necessary, a value different from zero can be chosen for the fixed compensation value to which the polarization is switched. The principle of switching the polarization to, for example zero before new information is written may be generally used, i.e. possibly with reset voltages (in MIMs and TFTs) which are independent of previous data, if the application permits longer waiting times (in a device driven at lower frequencies).

In summary, the invention provides the possibility of interrupting the memory effect in video applications of Deformed Helix Ferroelectric liquid crystal display devices by presenting the compensation voltages in matrix displays based on MIMs or TFTs, dependent on the data in a previous frame, so that the polarization within a cell always switches to a fixed value (zero). In other types of displays (based on diodes) or for less rapid applications, the polarization can also be readily set at this value.

What is claimed is:

1. A display device including a ferro-electric liquid crystal material with a deformable helix disposed between first and second substrates, said display device comprising:

a. a first group of picture electrodes supported by the first substrate;

b. a second group of commonly-electrically-connected picture electrodes supported by the second substrate;

facing pairs of the picture electrodes on opposite sides of the liquid crystal material defining respective pixels;

c. a plurality of row electrodes;

d. a plurality of column electrodes;

e. a plurality of three-terminal active switching elements, each having a first terminal electrically connected to a corresponding one of the row electrodes, having a second terminal electrically connected to a corresponding one of the column electrodes, and having a third terminal electrically connected to a corresponding one of the first group of picture electrodes, each of said active switching elements being operative to electrically connect the column electrode and picture electrode, which are electrically connected to the respective second and third terminals, upon application to the respective first terminal of a selection voltage;

f. means for presenting selection voltages to the row electrodes and data voltages to the column electrodes and for bringing, prior to selection, a row of the pixels to a fixed optical transmission state by means of an auxiliary signal during at least one of two consecutive drive periods; and g. a drive circuit for presenting a compensation voltage which determines the voltage amplitude of the auxiliary signal, at least a part of the compensation voltage being determined by the data voltage across a pixel during a previous drive period.

2. A display device as in claim 1 including a storage capacitor associated with each pixel.

3. A display device as in claim 1 where the compensation voltage is determined by the data voltage across the pixel during the previous drive period.

4. A display device as in claim 1 where the active switching element is a TFT and the compensation voltage is presented as the difference between a column electrode voltage and a voltage on the second group of picture electrodes.

5. A display device as in claim 1 where the drive periods are frame periods.

6. A display device as in claim 1 where the second group of picture electrodes comprise a common counter electrode.

7. A display device including a ferro-electric liquid crystal material with a deformable helix disposed between first and second substrates, said display device comprising:

a. a first group of picture electrodes supported by the first substrate;

b. a second group of commonly-electrically-connected picture electrodes supported by the second substrate;

facing pairs of the picture electrodes on opposite sides of the liquid crystal material defining respective pixels;

c. a plurality of row electrodes;

d. a plurality of column electrodes;

e. a plurality of three-terminal active switching elements, each having a first terminal electrically connected to a corresponding one of the row electrodes, having a second terminal electrically connected to a corresponding one of the column electrodes, and having a third terminal electrically connected to a corresponding one of the first group of picture electrodes, each of said active switching elements being operative to electrically connect the column electrode and picture electrode, which are electrically connected to the respective second and third terminals, upon application to the respective first terminal of a selection voltage; and f. means for presenting selection voltages to the row electrodes and data voltages to the column electrodes and a drive circuit for, prior to selection, effecting an equal value of polarization at each of a plurality of said pixels.

8. A display device as in claim 7 including a storage capacitor associated with each pixel.

* * * * *